United States Patent Office 2,966,972
Patented Jan. 3, 1961

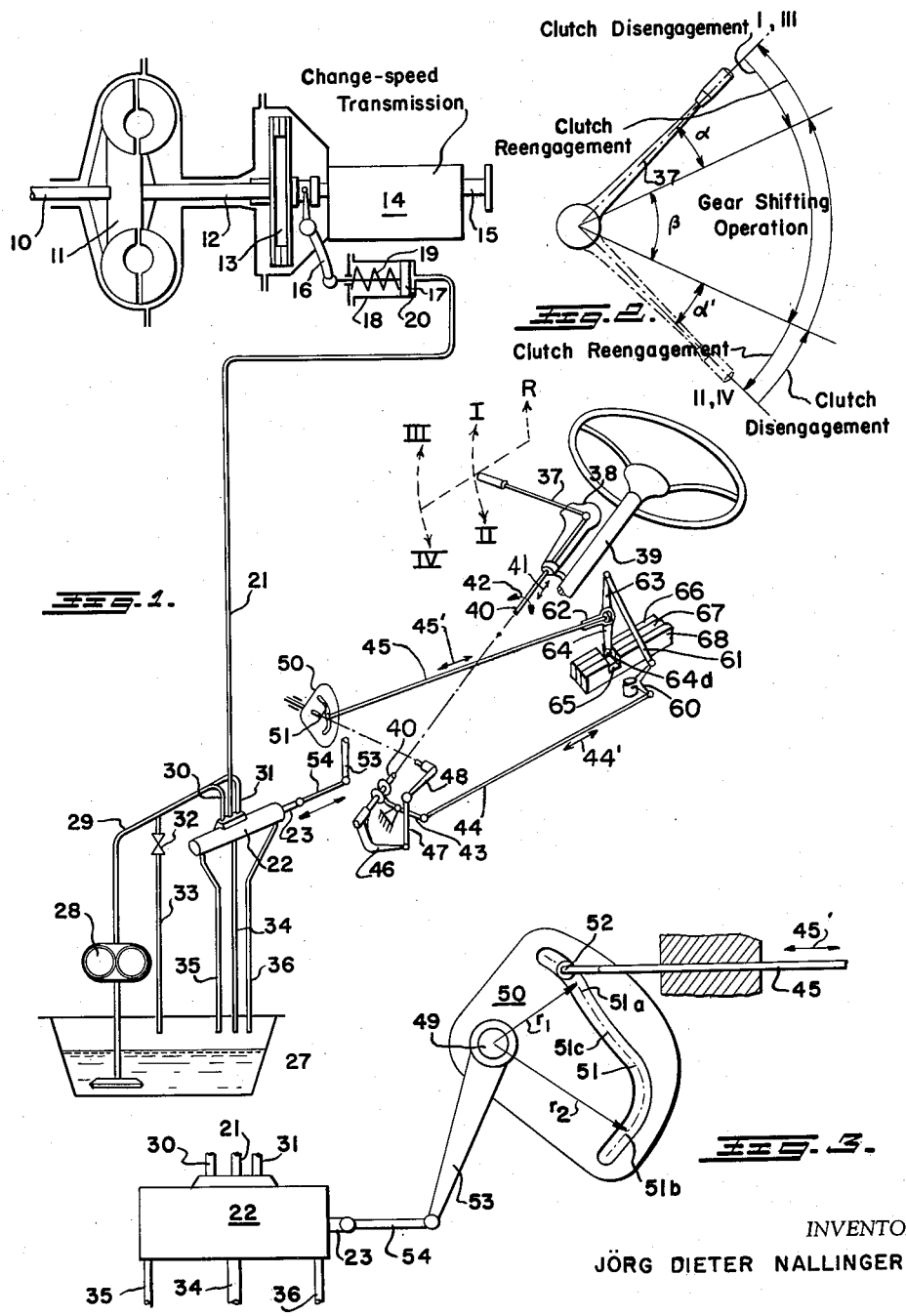

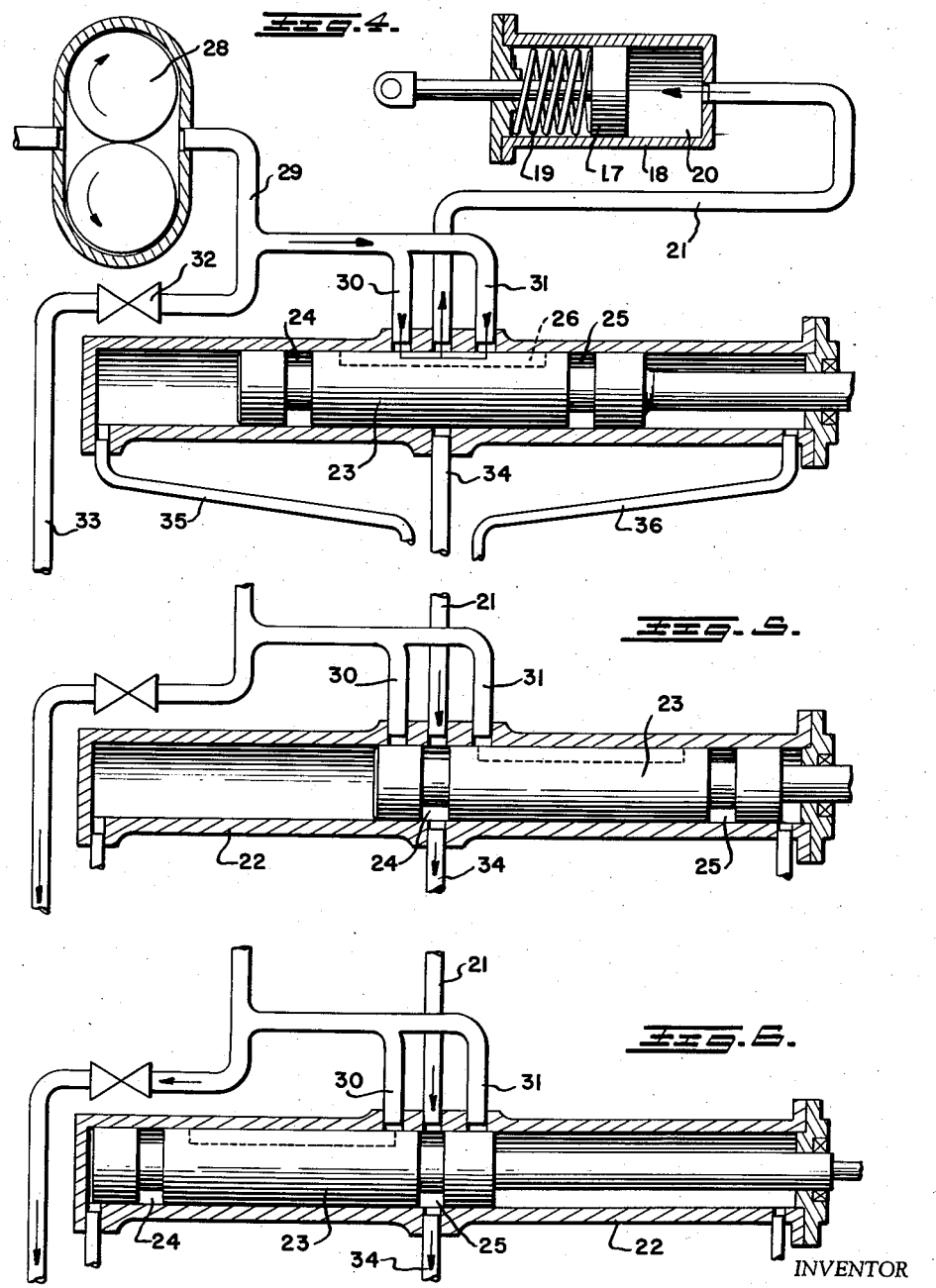

2,966,972

SHIFTING ARRANGEMENT FOR CHANGE-SPEED TRANSMISSION WITH ASSOCIATED CLUTCH

Jörg D. Nallinger, Toronto, Ontario, Canada, assignor to Daimler-Benz Aktiengesellschaft, Stuttgart-Unterturkheim, Germany Filed Oct. 31, 1955, Ser. No. 544,000

11 Claims. (Cl. 192—3.5)

The present invention relates to a shifting arrangement for a change-speed transmission associated with a clutch which may be located ahead or behind the change-speed transmission, and more particularly to an arrangement by means of which the clutch is disengaged prior to disengaging one of the speeds or gears of the change-speed transmission and is re-engaged only subsequent to the engagement of another gear or speed of the change-speed transmission.

It is, accordingly, an object of the present invention to provide a shifting arrangement which is both simple in structure and extremely reliable in operation, and which reduces wear and tear on the transmission parts.

Another object of the present invention is to provide a shifting arrangement in which the manual shifting lever is used to simultaneously control the clutch disengagement and re-engagement thereof as well as the shifting of the gears of the change-speed transmission.

Still another object of the present invention resides in the provision of a shifting arrangement in connection with a change-speed transmission and a clutch connected ahead or behind the change-speed transmission which assures that the individual gears of the transmission are shifted only while the clutch is disengaged.

Still another object of the present invention resides in the provision of a shifting control in which a common mechanically interconnected control arrangement is provided for controlling both the clutch and change-speed transmission and which includes a separate mechanical means for timing the gear shift operation independently of the operation of the clutch engagement and disengagement.

Another object of the present invention is to provide a gear shift arrangement in which simple mechanical linkages are used to independently control the timing of both the shifting of the gears or speeds of the change-speed transmission and the engagement and disengagement of the clutch.

A further object of the present invention is the provision of a control arrangement for a change-speed transmission and a clutch associated therewith whereby the clutch is first disengaged before the previously engaged speed or gear is disengaged and the next desired speed or gear is engaged before the clutch is again re-engaged or thrown in.

These and further objects, features and advantages of the present invention will become more obvious from the following description of a control arrangement in accordance with the present invention when taken in connection with the accompaying drawing which shows, for purposes of illustration only, one preferred embodiment in accordance with the present invention and wherein:

Figure 1 is a perspective schematic view of the overall control arrangement in accordance with the present invention.

Figure 2 is a schematic illustration indicating the sequence of operation of the clutch and transmission controls upon actuation of the gear shifting lever.

Figure 3 is a schematic indication on an enlarged scale of the arrangement for simultaneously controlling the main shifting rod linkage of the multi-speed transmission, on the one hand, and the control cylinder for the clutch, on the other.

Figure 4 is a cross sectional view of the control valve arrangement for the clutch with the gear shift lever in neutral position.

Figure 5 is a cross sectional view similar to Figure 4 of the control valve arrangement for the clutch with the gear shift lever in first, third or reverse speed, and Figure 6 is a cross sectional view similar to Figure 4 of the control arrangement with the gear shift lever in second and fourth speed.

Constructions are known in the prior art by means of which the shifting rod linkage for the transmission is directly connected or controlled by a curved disk which by means of its curved contours displaces a clutch lever so that the shifting rod linkage is displaced simultaneously with the engagement and disengagement of the clutch. However, such an arrangement exhibits the disadvantage that at least the beginning and the end of the shifting movement of the transmission members of the change-speed transmission takes place under load.

Furthermore, constructions are known in the prior art with an hydraulic shifting arrangement by means of which the clutching and shifting takes place depending on the position of a control slider or valve for a hydraulic medium. However, such an hydraulic shifting arrangement is relatively complicated, expensive and not desirable in all cases.

The present invention, in contradistinction thereto, provides a shifting arrangement which enables a sequential shifting of the clutch and speeds of the change-speed transmission with the simplest possible and most reliable means, and consists essentially in that the main shifting rod linkage which effects shifting of the gears and the rod linkage which effects control of the clutch are connected mechanically to the same shaft whereby the main shifting rod linkage is adjusted or displaced by means of a cam disk or plate, for example, by the use of a follower roll which engages a slot of predetermined contour, and the curved contour of the cam disk or plate is provided with two circular end sections with different constant radii respectively and an intermediate section of continuously changing radius connecting the two end sections in such a manner that the main shifting rod linkage is actuated only by the intermediate section of the curve while the rod linkage which effects the clutch control is adjusted or displaced during the entire movement of the cam plate or only during the period of movement of the common shaft in which the main shifting rod linkage moves within the region of the end sections.

The present invention enables the use of a clutch control linkage and of a change-speed gear shifting linkage which, in spite of the mechanical connections thereof to the same shaft actuated by the gear shift lever, operates in such a manner that a change in speed or gear takes place by a cam plate or disk separate from the means effecting the clutch control. The clutch control may thereby also be actuated continuously by means of a lever secured to the common shaft, whereby the engagement and disengagement of the clutch is obtained, for example, by a control valve or slider which is controlled in a corresponding manner.

The present inventiton provides an arrangement by such a construction which permits to first disengage the clutch, thereupon to change the speed or gears of the change-speed transmission and finally to re-engage the clutch. A change of the speeds or gears of the change-speed transmission while the same are under load may thereby be completely eliminated.

Preferably the common control shaft is displaced or actuated by the manual gear shifting shaft arranged in a conventional manner at the steering column of the vehicle over a rod linkage so as to be actuated when the gear shifting shaft, which may be operated by the driver in any suitable manner, for example, by the manual gear shifting lever, is rotated whereas the rod linkage of the gear shifting mechanism is connected to the gear shifting shaft independently of the clutch actuating mechanism in such a manner that it is displaced or actuated by axial movement of the manual gear shifting lever. The displacement of the clutch control member in that case takes place completely independently of the selection of the gears so that the latter may be carried out without influencing the operation of the clutch.

If the clutch is actuated by a hydraulic control arrangement, a control valve or slider is preferably provided which is also adjusted to a center position upon adjustment of the transmission shifting member to a center or neutral position and thereby conducts the shifting or control fluid to the control cylinder of the clutch to produce disengagement thereof, while upon engagement of one of the speeds it is displaced into an end position and thereby operatively connects the control cylinder of the clutch with the discharge line to produce re-engagement of the clutch.

Referring now more particularly to the drawing wherein like reference numerals are used throughout the various views, and more particularly to Figure 1, reference numeral 10 designates the shaft which may be driven from the engine (not shown), for example, by being connected to the end of the engine crankshaft. The hydraulic coupling 11 of any suitable construction connects the driving shaft 10 over a friction clutch 13 by means of a shaft 12, a change-speed transmission 14 with the driven shaft 15 which may be operatively connected, for example, with the vehicle wheels of a motor vehicle.

The friction clutch 13 is actuated by a lever 16 which in turn is operatively connected with the piston 17 located within the cylinder 18. The connection between the piston 17, the lever 16 and the clutch 13 is such that upon displacement of the piston 17 toward the left the clutch 13 is disengaged while engagement or re-engagement of the clutch 13 takes place by displacement of the piston 17 toward the right end position under the influence of a spring 19. The working space 20 located to the right of the piston 17 within the cylinder 18 is connected to the control cylinder 22 by means of a line 21.

A control slider or valve 23 is provided within the control cylinder 22 for movement between two end positions illustrated in Figures 5 and 6 and to be described more fully hereinafter.

The control valve 23 is provided with two annular control grooves 24 and 25 and a longitudinal groove 26 which extends externally in the axial direction thereof. The hydraulic pressure medium which is controlled by the control valve 23 is supplied to the control cylinder 22 from a reservoir 27, which may also be, for example, the oil sump of the driving engine, by a pump 28 and a bifurcated pressure line 29 terminating in lines 30 and 31. An excess or overpressure valve 32 is located in a bypass line 33 so as to return the excess pressure oil supplied by the pump 28 to the reservoir 27. A return line 34 as well as two leakage oil lines 35 and 36 are provided to return the fluid or hydraulic medium from the control cylinder 22 to the reservoir 27.

The shifting rod linkage for the change-speed gear 14 is actuated by a shifting lever 37 which is supported and journalled in a well-known manner, for example, in a bearing 38 at the steering column 39 in such a manner that the shifting rod 40 may be displaced or adjusted in the axial direction indicated by arrow 41 as well as in the rotational direction thereof indicated by arrow 42. During actuation of the shifting rod 40 in either axial direction 41 the axial mode of movement thereof is transmitted to a preselecting rod linkage 44 for the transmission 14 by means of an intermediate lever 43, the preselecting rod linkage preselecting the shifting arrangement of the change-speed transmission upon displacement thereof in either direction indicated by arrow 44′ to first/second or third/fourth or reverse speeds depending on the axial position thereof as is well known in the art. Thus the preselecting rod linkage determines or preselects, depending on its axial position, any one of three groups of speeds from which one group a particular speed is selected by predetermined axial movement of rod linkage 45. The three groups each include at least one speed and include respectively first and second speeds, third and fourth speeds, and reverse speed. The main shifting rod linkage 45 is adjusted or displaced by rotation of the shifting rod 40 in either direction of its rotational mode of movement indicated by arrow 42 in that it is moved in either direction of the arrow indicated by reference numeral 45′ by means of lever 46, intermediate rod 47, lever 48, shaft 49 and cam disk 50 secured to shaft 49. For that purpose the cam plate or disk 50 is provided with a slot-like control curve 51 into which the main shifting rod linkage 45 engages by means of a follower roll 52 or the like.

A lever 53 rigidly mounted on the shaft 49 adjusts the control slider or valve 23 in cylinder 22 by means of rod 54.

As may be seen in particular from Figure 3 the curved slot 51 of the cam disk 50 consists of a circular end section 51a having a radius $r_1$, a circular end section 51b having a radius $r_2$ and an intermediate transition section 51c of continuously changing radius which passes over from radius $r_1$ to the radius $r_2$.

A typical change-speed transmission to be actuated by the present control system may include three slide bars 66, 67 and 68 corresponding to the aforementioned groups of transmission speeds. The selection of a particular group of speeds is made by movement of the shifting lever, for example, to the illustrated position in Figure 1 in which it is the neutral position between speeds I and II and in which the rod 44 has been adjusted to a position in which the intermediate slide bar 67 is selected to be moved longitudinally to engage either speed I or speed II, depending upon the direction of axial movement of rod 45 as lever 37 is rotated in the direction of arrows 42. The selection of a particular slide bar is achieved, for example, by a crank member 60 and a tie rod 51, the latter being pivotally connected to the upper end 63 of a cross bar 64 which is rotatably supported on rod 45 by the bearing sleeve structure 62 and which is axially movable with the rod 45 to move a preselected slide bar by means of the actuator 64a at the lower end of bar 64. By rotating the bar 64 about the rod 45 the actuator 64a may be positioned in any of the three cutouts 65 of the slide bars and by axial movement of the rod 45 the actuator 64a is caused to engage one or the other side of the respective cutout 65 to shift the respective slide bar longitudinally. In the illustrated position, movement of the actuator to move the slide bar 67 to the left would cause engagement of transmission speed II, whereas movement of the actuator 64a and slide bar 67 to the right would engage transmission speed I. When the actuator 64a is manipulated into the cutouts of one of the outer bars 66 and 68, a respective one of the groups of transmission speeds R or III and IV is respectively selected.

*Operation*

The operation of the control arrangement described above is as follows:

In the neutral position of shifting lever 37 the cam disk 50 also is in a central or medium position so that the follower roll 52 is approximately in the center of the section 51c and the control valve 23 within control cylinder 22 assumes the central position indicated in Figure 4.

Under these circumstances with the engine running, the oil is forced or supplied under pressure by the pump 28 through the lines 29, 30 and 31, the longitudinal control groove 26 in the control valve 23 and over line 21 to the working space 20 of the clutch cylinder 18 thereby forcing the piston 17 toward the left against the spring force of spring 19 and thereby disengaging the friction clutch 13.

If the shifting lever is shifted upwardly to first, third or reverse speed by rotating the shifting rod 40 in the direction of the arrow 42 after the selected one of these speeds had been predetermined by the choice of a particular preselected group of transmission speeds depending on the adjustment of the shifting rod 40 in the axial direction 41 thereof, the clockwise rotation of the shaft 40, as viewed in Figure 1, will produce a corresponding rotation of the shaft 49 in a counter-clockwise direction thereby moving the control valve 23 toward the right by means of linkage 53 and 54. At the same time the cam disk 50 also moves in the counter-clockwise direction. This counter-clockwise rotation of the cam disk 50 brings about movement of the follower roll 52 along the section 51c into the section 51b of the slot 57 whereby the main shifting rod linkage 45 is adjusted toward the right due to the continuously varying radius of section 51c and the desired speed is engaged.

As long as the follower roll 52 proceeds within the intermediate section 51c of the curved slot 51, the friction clutch 13 remains disengaged as the oil pressure from the oil pump may continue to reach the working space 20 of the control cylinder over the longitudinal groove 26 in the control valve 23 and may thereby maintain the clutch piston 17 in the left end position thereof. However, as soon as the follower roll 52 reaches the section 51b having a radius $r_2$ the main shifting rod linkage 45 remains stationary after engagement of the desired speed as the radius remains constant, while upon further rotation of shaft 49 and movement of the follower roll 52 along the radius $r_2$ the control valve 23 in the control cylinder 22 moves further toward the right by reason of its linkage connection 53 and 54 with the shaft 49 until it reaches its right end position shown in Figure 5. The control valve 23 in the right end position connects the working space 20 of the clutch cylinder 18 with the oil reservoir 27 over the line 21, the annular control groove 24 and the return or discharge line 34. This connection assures that the oil pressure in the clutch cylinder 18 drops immediately and the spring 19 is rendered effective to move the piston 17 toward the right thereby re-engaging the friction clutch 13.

In the meantime the oil pressure in line 29 increases as the control valve 23 blocks the delivery of oil through the inlet lines 30 and 31. However, the oil supplied by the pump 28 may flow back to the reservoir 27 through the overpressure valve 32 and the bypass line 33.

If the shifting lever 37 is shifted, for example, from the first into second or third into fourth, then the control valve 23 is displaced from its right end position indicated in Figure 5 over the center position indicated in Figure 4 into the left end position shown in Figure 6 while the cam disk 50 rotates in the clockwise direction and the follower roll 52 moves in the curved slot 51 from section 51b thereof over section 51c into the section 51a. This produces the following control effects:

As long as the follower roll 52 remains in the section 51b the main shifting rod linkage 45 is not moved as the radius remains constant. However, in the meantime the control valve 23 is moved sufficiently to the left so as to render control groove 26 effective to supply the hydraulic pressure medium to the working space 20 thereby supplying pressure oil to the working chamber 20 and urging the piston 17 to the left to disengage the friction clutch 13.

As the follower roll 52 passes over into section 51c, with the clutch 13 previously disengaged, the main shifting rod linkage 45 is moved in the direction of arrow 45' toward the left thereby disengaging the pre-existing speed and re-engaging an other desired new speed of the appropriate group of speeds preselected by axial movement of the shifting rod 40 and movement of the preselecting rod 44. As the follower roll 52 approaches the section 51a the new speed has been completely engaged while the clutch is still disengaged. However, as soon as the follower roll 52 enters section 51a of constant radius $r_1$ the main shifting rod linkage 45 remains stationary. As the shaft 49 continues to rotate clockwise the control valve 23 is moved from an intermediate position toward its left end position in which the line 21 is connected with the discharge line 34 by means of the annular groove 25.

Thus it is seen that the clutch is first disengaged which takes place during rotation of the shaft 49 over an angle not exceeding the section 51a or 51b of constant radii, thereupon the speed of the transmission is changed while the follower roll 52 follows the intermediate section 51c of continuously varying radius, and finally upon engagement of the predetermined speed the follower 52 engages the other section 51b or 51a respectively of constant radius in which the gear shift rod linkage 45 remains stationary while the clutch 13 is re-engaged.

The operation of the gear shift arrangement in accordance with the present invention is also schematically illustrated in Figure 2 in which the gear shift lever 37 (shown in full lines as viewed from the driver's position) is shown as being in either first or third speed indicated by I and III. Upon rotation of the gear shift lever 37 in the clockwise direction as viewed in Figure 2 the shaft 49 is also rotated in a clockwise direction as viewed in Figure 1 whereby the clutch is disengaged while at the same time no change takes place in the transmission ratio while the follower roll 52 engages the section 51b. The disengagement of the clutch thus takes place while the gear shift lever 37 is rotated through an angle $\alpha$. Upon further rotation of the gear shift lever 37 in a clockwise direction as viewed in Figure 2 through angle $\beta$ the clutch remains disengaged while the gear shift operation changing the speed takes place. Upon still further rotation in the clockwise direction of gear shift lever 37 as viewed in Figure 2 through an angle $\alpha'$ to the position thereof indicated in dash and dotted lines, the clutch is re-engaged while the gear shift rod linkage 45 remains stationary since the follower roll now engages the section 51a.

If the gear shift lever is in second or fourth speed indicated in Figure 2 by II or IV, the engagement of the clutch, gear shifting operation and re-engagement of the clutch will take place in the same sequence.

While I have shown one preferred embodiment of my invention, it is understood that the same is susceptible of many changes within the scope of a person skilled in the art and I intend to cover all such changes and modifications except as limited by the appended claims.

I claim:

1. In a motor vehicle a change-speed transmission having at least three speeds with an input shaft and an output shaft and a clutch comprising driving and driven elements, one of said elements being operatively connected with one of said shafts, the combination comprising mechanical linkage means having a first mode of operation for preselecting from said speeds particular groups of speeds to be engaged, each group including at least one speed, and a second mode of operation for selectively engaging the individual speeds of the preselected speed group of said transmission, control means for controlling said clutch to effect engagement or disengagement thereof, a common mechanical actuating means for actuating both modes of operation of said linkage means and said control means, said common actuating means including a pair of lost motion producing elements mechanically coupled to said linkage means and providing lost motion for each selected speed for initially delaying disengagement of each previously engaged speed during the initial period of movement of said actuating means while said clutch is first disengaged and for delaying re-engagement of said clutch until any desired next speed is engaged during gear shifting operation of said actuating means.

2. In a motor vehicle a change-speed transmission having at least three speeds with an input shaft and an output shaft and a clutch comprising driving and driven elements, one of said elements being operatively connected with one of said shafts, the combination comprising mechanical linkage means including a first actuator for preselecting from said speeds particular groups of speeds to be engaged, each group including at least one speed, and a second actuator for selectively engaging the individual speeds of the preselected speed group of said transmission, hydraulic control means for selectively controlling said clutch to effect engagement or disengagement thereof, a common mechanical actuating means mechanically coupled to said linkage means and said control means for actuating both said actuators and said control means, said common actuating means including a separate cam means having a single active cam surface of predetermined contour mechanically coupled with said linkage means for initially delaying disengagement of each previously engaged speed during the initial period of movement of said actuating means while at first said clutch is disengaged and for delaying re-engagement of said clutch until any desired next speed is engaged during gear shifting operation of said actuating means.

3. In a motor vehicle, the combination according to claim 2, wherein said cam means is provided with two curved end sections of essentially constant but different radii respectively, and an intermediate section of continuously changing radius connecting said end sections, and said linkage means includes a cam follower whereby said linkage means is operated only while said cam follower moves along said intermediate section.

4. In a motor vehicle with a change-speed transmission having at least three speeds with an input shaft and an output shaft and a clutch including driving and driven elements, one of said elements being coupled to one of said shafts, the combination comprising mechanical linkage means for actuating said transmission to engage any of said speeds, control means for controlling the engagement and disengagement of said clutch, common actuating means for operating both said linkage means and said control means, said common actuating means including a common shaft, means for positively connecting said control means with said common shaft and means for positively connecting said linkage means with said common shaft, said last-mentioned connecting means including cam means having only one mode of operation and follower means connected with said linkage means in operative engagement with said cam means to delay disengagement of each previously engaged speed until disengagement of the clutch and for engaging any next desired speed prior to re-engaging said clutch upon actuation of said actuating means to effect a change in the transmission ratio of said transmission, and mechanical linkage means connected to said shaft and responsive to predetermined movement of said shaft for preselecting one of a plurality of groups of transmission speeds from which one group a speed is to be selectively engaged by actuation of said first-mentioned linkage means.

5. In a motor vehicle with a change-speed transmission having at least three speeds with an input shaft and an output shaft and a clutch including driving and driven elements, one of said elements being coupled to one of said shafts, the combination comprising mechanical linkage means for actuating said transmission to engage any of said speeds, control means for controlling the engagement and disengagement of said clutch, common actuating means for operating both said linkage means and said control means, said common actuating means including a common shaft, means for positively connecting said control means with said common shaft and means for positively connecting said linkage means with said common shaft, said last-mentioned connecting means including cam means active to effect engagement and disengagement of each of said speeds and having two end sections of constant but different radii respectively and an intermediate section connecting said end sections and follower means connected with said linkage means in operative engagement with said cam means to delay disengagement of any previously engaged speed until disengagement of the clutch while said follower means moves along one of said end sections and for engaging the next desired speed prior to re-engaging said clutch while said follower means moves along said intermediate section upon actuation of said actuating means to effect a change in the transmission ratio of said transmission, and mechanical linkage means connected to said shaft and responsive to predetermined movement of said shaft for preselecting one of a plurality of groups of transmission speeds from which one group a speed is to be selectively engaged by actuation of said first-mentioned linkage means.

6. In a motor vehicle the combination according to claim 5, wherein said cam means is provided with a curved slot-like aperture having a contour corresponding to said end sections interconnected by said intermediate section, and said follower means engages said slot-like aperture.

7. In a motor vehicle with a change-speed transmission having at least three speeds with an input shaft and an output shaft and a clutch including driving and driven elements, one of said elements being coupled to one of said shafts, the combination comprising mechanical linkage means for actuating said transmission to engage any of said speeds, control means including a hydraulically operated piston and a control valve for controlling engagement and disengagement of said clutch, a common actuating means for operating both said linkage means and said control means, said common actuating means including a common shaft, means for positively connecting said control valve with said common shaft and means for positively connecting said linkage means with said common shaft, said last-mentioned connecting means including cam means active to effect engagement and disengagement of each of said speeds and having two end sections of constant but different radii respectively and an intermediate section connecting said end sections and follower means connected with said linkage means in operative engagement with said cam means to delay disengagement of any previously engaged speed until disengagement of the clutch while said follower means moves along one of said end sections and for engaging the next desired speed prior to re-engaging said clutch while said follower means moves along said intermediate section upon actuation of said actuating means to effect a change in the transmission ratio of said transmission, mechanical linkage means connected to said shaft and responsive to predetermined movement of said shaft for preselecting one of a plurality of groups of transmission speeds from which one group a speed is to be selectively engaged by actuation of said first-mentioned linkage means.

8. In a motor vehicle the combination according to claim 7 wherein said control valve includes a plurality of control grooves, and wherein said means for positively connecting said control valve with said shaft is operative to adjust said control valve to a central position with said actuating means in a neutral position intermediate two speeds to thereby supply the hydraulic pressure medium to said piston over one of said grooves to thereby disengage said clutch and is operative to adjust said control valve to an end position upon adjustment of said actuating means to a position in which one of the speeds of said transmission is engaged to thereby discharge the hydraulic medium actuating said piston over another one of said grooves to re-engage said clutch.

9. In a motor vehicle having a change-speed transmission having at least three speeds with an input shaft and an output shaft and a clutch including driving and driven elements, one of said elements being coupled to one of said shafts, the combination comprising first and second mechanical linkage means for preselecting from said speeds particular groups of speeds to be engaged, each group including at least one speed, and for engaging the individual speeds of the preselected speed group of said transmission, respectively, control means including a control valve, a hydraulically operated piston and a line connecting said control valve with the working space of said piston for controlling the engagement and disengagement of said clutch, a common actuating means for operating the first mechanical linkage means upon axial movement thereof and for operating both said second linkage means and said control means upon rotation thereof, said common actuating means including a common shaft, means for positively connecting said control valve with said common shaft and means for positively connecting said second linkage means with said common shaft, said last-mentioned connecting means including cam means having two end sections of constant but different radii respectively and an intermediate section connecting said end sections and follower means connected with said second linkage means in operative engagement with said cam means to delay disengagement of any previously engaged speed until disengagement of the clutch while said follower means moves along one of said end sections and for engaging the next desired speed prior to re-engaging said clutch while said follower moves along said intermediate section upon actuation of said actuating means to effect a change in the transmission ratio of said transmission.

10. In a motor vehicle the combination according to claim 9 wherein said control valve includes a plurality of control grooves and is adapted to be moved between two end positions, wherein said control means includes a cylinder for said control valve, means for supplying a hydraulic medium under pressure to said cylinder and a discharge line connected with said cylinder, and wherein said means for positively connecting said control valve with said common shaft is operative to adjust said control valve to one of its end positions with said actuating means in a position corresponding to an engaged speed to thereby connect said first-mentioned line with said discharge line over one of said control grooves to engage said clutch and wherein said means for positively connecting said control valve with said common shaft is operative to move said control valve from one end position to another end position with said actuating means rotated to change the transmission ratio of said transmission to thereby supply hydraulic medium under pressure through another one of said grooves to the working space of said piston to disengage said clutch before said common shaft is rotated an amount exceeding rotation through an angle corresponding to the arc of one of said end sections of said cam means.

11. In a motor vehicle with a multi-speed transmission having at least three speeds with an input shaft and an output shaft and a clutch including driving and driven elements, one of said elements being operatively connected with one of said shafts, the combination comprising means for selectively engaging the individual speeds of said transmission including a first transmission actuator movable to a first station for preselecting a group of two of said speeds and to a least one other station for preselecting another group including at least one other speed, said means also comprising a second transmission actuator movable to different positions while said first actuator is in any one of said stations for selectively engaging, respectively, the transmission speeds of the group of speeds preselected at said one station, means for selectively engaging or disengaging said clutch including a clutch actuator and a common control means coupling said actuators, said last-mentioned coupling means comprising a mechanical coupling between said second transmission actuator and said clutch actuator for disengaging said clutch prior to disengaging any engaged speed of the transmission and for engaging any speed of the transmission prior to engagement of the clutch during a gear-shifting operation of said control means.

References Cited in the file of this patent

UNITED STATES PATENTS

| | | |
|---|---|---|
| 1,778,970 | Cotta et al. | Oct. 21, 1930 |
| 1,805,120 | Von Erhardt | May 12, 1931 |
| 2,073,692 | Griswold | Mar. 16, 1937 |
| 2,074,476 | Kolb | Mar. 23, 1937 |
| 2,079,682 | Chilton | May 11, 1937 |
| 2,100,810 | Livermore | Nov. 30, 1937 |
| 2,104,061 | Surdy | Jan. 4, 1938 |